Aug. 20, 1968  F. H. PRESTWOOD  3,398,361
TRAVELING WAVE TUBE TEST APPARATUS
Filed Aug. 13, 1965
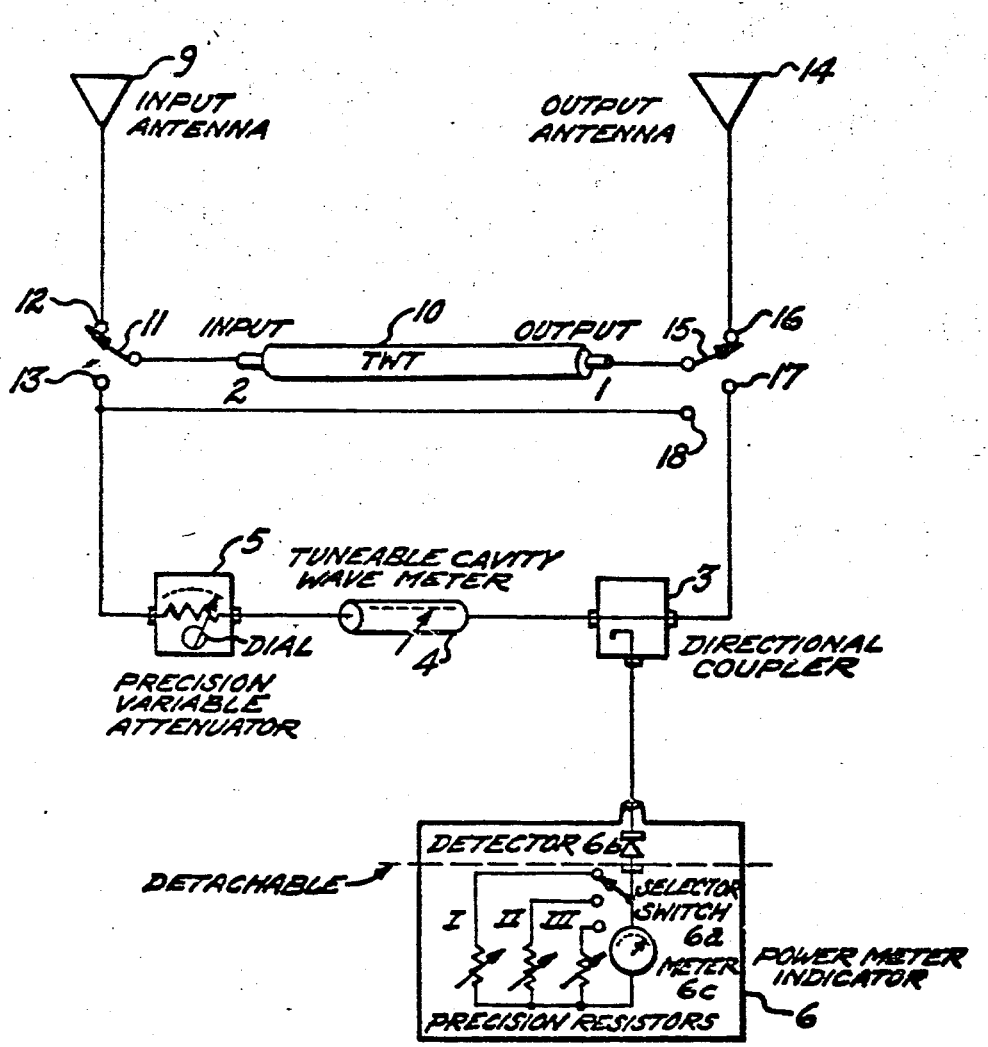
INVENTOR.
FRANKLIN H. PRESTWOOD
BY Harry A. Herbert Jr.
George Fine
ATTORNEYS

United States Patent Office 3,398,361
Patented Aug. 20, 1968

3,398,361
TRAVELING WAVE TUBE TEST APPARATUS
Franklin H. Prestwood, P.O. Box 237,
Valparaiso, Fla. 32580
Filed Aug. 13, 1965, Ser. No. 479,676
3 Claims. (Cl. 324—58)

ABSTRACT OF THE DISCLOSURE

Apparatus for monitoring the performance of a traveling wave tube by disconnecting it from signal receiving and signal utilization means and simultaneously connecting a controlled calibrated feed-back test loop thereto and then adjusting the feed-back loop to obtain oscillation for subsequent registration upon a meter.

---

The invention described herein may be manufactured and used by or for the United States Government for governmental purposes without payment to me of any royalty thereon.

This invention relates to test apparatus for monitoring the performance of a traveling wave tube when utilized as a booster (augmenter) of radar signals in aircraft armament training mission involving the use of drones and tow targets.

The device described herein is a passive test set that is used with traveling wave tube (TWT) type radar augmenters. Small signal gain, power output, and stability of the TWT may be determined with this passive device by measuring power output when the TWT has been made to go into oscillation. This unique technique is achieved by novel design features wherein TWT oscillation occurs through a controlled calibrated feed-back test loop.

This invention provides a device which is extremely reliable because there are no active parts such as signal generating components, amplifying devices, or power supplies. The cost of this device is one-tenth (1/10) that of any known existing device used to perform a similar test on TWT augmenters. This test set is adaptable to any frequency band where TWT type augmenters, or amplifiers, have application. Still further this device is extremely simple to operate and maintain. It may be operated by personnel other than those with electronic training. The only requirement for maintenance is yearly calibration. The supply problem is drastically reduced because there are no active electronic parts, or batteries to deteriorate during storage. This invention requires no external or internal power supply, the sampled TWT power is used to operate the test set. Finally, this device can be packaged in a very small configuration. For example, the weight could be held to under one pound, and the volume could be restricted to a few cubic inches.

The device of the present invention described herein will solve an Air Force problem by providing an augmenter test set which is simple in design and easy to operate. These features are achieved by taking advantage of the TWT augmenter output power to provide a passive test set which requires no external power, or batteries for operation. Existing test equipment for TWT augmenters requires several components such as signal generating sources, amplifying receivers, and power supplies. Existing equipment must also be operated by specially trained personnel.

The purpose of this invention is to provide a reliable, low cost means of testing traveling wave tube (TWT) type radar augmenters, which are used in support of drones and aerial tow targets during aircraft armament training missions. The device may be incorporated as part of one preflight check out system for drones or aerial tow targets. The device could also be incorporated as part of a radar augmenter pod for preflight check out of nonexpendable pods used on aircraft for radar training missions.

The object of the present invention is to provide test apparatus for monitoring the performance of a traveling wave tube.

Another object of the present invention is to provide a passive testing device to be utilized with a traveling wave tube type radar augmenter (booster).

The various features of novelty which characterize this invention are pointed out with particularly in the claims annexed to and forming part of this specification. For a better understanding of the invention, however, its advantages and specific objects obtained with its use, reference should be had to the accompanying drawing and descriptive matter in which is illustrated and described a preferred embodiment of the invention.

Now referring to the single drawing of the present invention, there is shown traveling wave tube 10 whose performance is to be tested for small signal gain. For typical augmenter (booster) testing, traveling wave tube 10 is disconnected from input antenna 9 by throwing switch 11 from position 12 to 13. Simultaneously traveling wave tube 10 is disconnected from output antenna 14 by throwing switch 15 from position 16 to 17. Traveling wave tube 10 is then connected for test purposes so that the output thereof is fed to directional coupler 3 and the input is connected to precision variable attenuator 5. With the test apparatus connected in this manner it acts as a feed-back loop with controlled attenuation. The signal from output 1 of traveling wave tube 10 flows through directional coupler 3, tunable cavity 4, precision variable attenuator 5, and then to input 2 of traveling wave tube 10. Signal to power meter indicator 6 is tapped down through directional coupler 3 where it gives an indication by meter deflections. The precision variable attenuator 5 is reduced in attenuation to a point where power meter indicator 6 shows an indication with its selector switch 6a in the most sensitive position (position I). This is the point where oscillations begin, and small signal gain may be read from the dial of attenuator 5 on a portion which may be marked in a preselected color such as green and labelled *small signal gain db*. A typical X-band traveling wave tube will indicate approximately 65 db.

Typical component characteristics are as follows: (1) Directional coupler 3 couples signal energy 20 db down toward power meter 6, and has low insertion attenuation (approximately 0.5 db toward tunable cavity wave meter 4); (2) Tunable cavity wave meter 4 is coaxial and manually tunable from 8.6 gc. to 9.6 gc. The traveling wave tube continuously emits noise over its entire band width so that any specific frequency desired may be injected through the tunable cavity wave meter; (3) Precision variable attenuator 5 is manually variable from 20 db to 75 db (in calibrating the attenuator the total loss of the feed-back loop is compensated for and is included in the dial reading); (4) Power meter indicator 6 is sensitive to X-band signals from −10 dbm through +15 dbm. Detector 6b is a 1N23B type crystal, selector switch 6a is a single pole three throw, resistors I, II, and III are precision variable, and meter 6c is a microampere type. This meter is adjusted by means of precision resistors to show no indication until oscillation has commenced. For example, there must be at least 10 db higher signal output from the traveling wave tube the normal inherent noise output before the meter deflects. This meter circuit is a well established state of the art, reference Radio Engineers Handbook, Terman, page 902.

The apparatus of the present invention may be utilized to perform power output tests wherein it is connected exactly as in the small signal gain test as described above. Precision variable attenuator 5 is further reduced in attenuation and power meter indicator 6 is observed for maximum indication. If meter 6c goes off scale, other positions are switched in until meter 6c stays on scale. After maximum deflection has occurred, a reading is obtained on the portion of the attenuator dial having a preselected color such as red and which is labelled +dbm. A typical X-band traveling wave tube will indicate approximately +34 dbm, or 2.5 watts of power. The meter section of the power meter indicator 6 may be replaced with any sensitive microampere meter or test set capable of microampere indication.

In order to provide an oscillation test the apparatus is connected to output 1 of traveling wave tube 10 by placing switch 15 in position 18, however, input 2 of traveling wave tube 10 is disconnected by removing switch 11 from position 13. This test will determine the traveling wave tube stability; that is, to see if internal oscillation is occurring. This condition will be evident by a meter deflection on power meter 6.

Built in directional couplers such as 3, could be incorporated in the design of the traveling wave tube augmenters to further reduce the number of component parts required for this tester.

What I claim is:

1. Apparatus for performance measurements of a traveling wave tube comprising a traveling wave tube having input and output, signal receiving means connected to said input, signal utilization means connected to said output, said signal receiving and signal utilization means being normally connected to said traveling wave tube, a controlled feed-back test loop for said traveling wave tube consisting of a series arrangement of a directional coupler, a tunable cavity wavemeter, and a precision variable attenuator, respectively, said controlled feed-back test loop being normally disconnected, means to disconnect said signal receiving and signal utilization means while simultaneously connecting said controlled feed-back test loop directly between said output and said input of said traveling wave tube, upon said disconnection and said connection the received signal ceases to flow in said traveling wave tube, and a meter also connected to said directional coupler, said precision variable attenuator being reduced in attenuation to a point where said meter provides an indication to show the beginning of oscillation in said traveling wave tube, said tunable cavity wavemeter also simultaneously being adjusted to a preselected frequency, said reduction of said precision variable attenuator and said adjustment of said tunable cavity wavemeter being performed after said disconnection of said signal receiving and signal utilization means and said connection of said controlled feed-back test loop thus providing a small signal gain test for said traveling wave tube.

2. Apparatus for measurements of a traveling wave tube as described in claim 1 wherein said meter is comprised of a detector connected to said directional coupler, a microampere meter connected to said detector, a multiplicity of resistors, and a switch to selectively parallel a preselected one of said resistors with said microampere meter.

3. Apparatus for performance measurements of a traveling wave tube comprising a traveling wave tube having input and output, signal receiving means connected to said input, signal utilization means connected to said output, said signal receiving and signal utilization means being normally connected to said traveling wave tube, a controlled feed-back test loop for said traveling wave tube consisting of a series arrangement of a directional coupler, a tunable cavity wavemeter, and a precision variable attenuator, respectively, said controlled feed-back test loop being normally disconnected, means to disconnect said signal receiving and signal utilization means while simultaneously connecting said controlled feed-back test loop directly between said output and said input of said traveling wave tube, upon said disconnection and said connection the received signal ceases to flow in said traveling wave tube, and a meter also connected to said directional coupler, said precision variable attenuator being reduced in attenuation to obtain maximum indication of said meter, said tunable cavity wavemeter also simultaneously being adjusted to a preselected frequency, said reduction of said precision variable attenuator and said adjustment of said tunable cavity wavemeter being performed after said disconnection of said signal receiving and signal utilization means and said connection of said controlled feed-back test loop thus providing a power output test for said traveling wave tube.

References Cited

UNITED STATES PATENTS

| | | | |
|---|---|---|---|
| 2,768,297 | 10/1956 | Brück et al. | 331—82 X |
| 2,829,252 | 4/1958 | Bryant | 331—82 |
| 3,048,794 | 8/1962 | Ares | 331—82 X |
| 3,218,561 | 11/1965 | Moeller | 331—82 X |
| 3,327,245 | 6/1967 | Britton | 331—82 X |

RUDOLPH V. ROLINEC, *Primary Examiner.*

P. F. WILLE, *Assistant Examiner.*